(12) United States Patent
Garcia

(10) Patent No.: US 6,646,967 B1
(45) Date of Patent: Nov. 11, 2003

(54) METHOD FOR MAKING COPY PROTECTED OPTICAL DISCS

(75) Inventor: Ben Garcia, Conyers, GA (US)

(73) Assignee: Denon Digital LLC, Madison, GA (US)

(*) Notice: Subject to any disclaimer, the term of this patent is extended or adjusted under 35 U.S.C. 154(b) by 718 days.

(21) Appl. No.: 08/909,545

(22) Filed: Aug. 12, 1997

(51) Int. Cl.[7] .................................................. G11B 7/00
(52) U.S. Cl. ..................................................... 369/53.21
(58) Field of Search ........................ 369/275.1, 275.3, 369/275.4, 292, 272, 59, 60, 48, 47, 58, 54, 53.21, 32; 380/3, 4

(56) References Cited

U.S. PATENT DOCUMENTS

| | | | |
|---|---|---|---|
| 4,975,898 A * | 12/1990 | Yoshida | 369/48 |
| 5,311,498 A * | 5/1994 | Horiguchi | 369/47 |
| 5,400,319 A * | 3/1995 | Fite et al. | 369/292 |
| 5,541,904 A * | 7/1996 | Fite et al. | 369/47 |
| 5,570,339 A * | 10/1996 | Nagano | 369/275.3 |
| 5,592,454 A * | 1/1997 | Tobita et al. | 369/58 |
| 5,608,718 A * | 3/1997 | Schiewe | 369/275.3 |
| 5,617,408 A * | 4/1997 | Nishizawa et al. | 369/275.4 |
| 5,650,991 A * | 7/1997 | Fujii | 369/48 |
| 5,654,950 A * | 8/1997 | Itoh | 369/58 |
| 5,671,202 A * | 9/1997 | Brownstein et al. | 369/58 |
| 5,671,205 A * | 9/1997 | Leddieu | 369/103 |
| 5,696,757 A * | 12/1997 | Ozaki et al. | 369/58 |
| 5,703,858 A * | 12/1997 | Mitchell et al. | 369/53 |
| 5,703,859 A * | 12/1997 | Tahara et al. | 369/84 |
| 5,706,266 A * | 1/1998 | Brownstein et al. | 369/58 |
| 5,751,671 A * | 5/1998 | Koike et al. | 369/14 |
| 5,761,301 A * | 6/1998 | Oshima et al. | 369/272 |
| 5,787,068 A * | 7/1998 | Arps et al. | 369/54 |
| 5,790,499 A * | 8/1998 | Itoh | 369/53 |
| 5,805,549 A * | 9/1998 | Fite et al. | 369/48 |
| 5,805,551 A * | 9/1998 | Oshima et al. | 369/59 |
| 5,807,640 A * | 9/1998 | Ueno et al. | 369/275.1 |
| 5,809,006 A * | 9/1998 | Davis et al. | 369/50 |
| 5,809,545 A * | 9/1998 | Ozaki et al. | 369/60 |
| 5,812,501 A * | 9/1998 | Moribe et al. | 369/58 |
| 5,812,512 A * | 9/1998 | Tobita et al. | 369/60 |
| 5,815,484 A * | 9/1998 | Smith et al. | 369/47 |
| 5,828,754 A * | 10/1998 | Hogan | 369/59 |

* cited by examiner

Primary Examiner—Nabil Hindi
(74) Attorney, Agent, or Firm—Young & Thompson (57) ABSTRACT

A machine-non-readable defect is formed on a CD-ROM by re-modulation of a master cutting laser beam recorder. Re-modulation in specific program areas creates non-readable marks which interfere with any attempt to image-copy the CD-ROM. The non-machine-readable marks can be followed by valid data which may be used as keys to verify the authenticity of the CD-ROM. The machine-non-readable defect is invisible to the human eye to thwart detection and subsequent reverse engineering attempts.

17 Claims, 9 Drawing Sheets

CREATING AUTHENTIC DISC

METHOD FOR MAKING COPY PROTECTED OPTICAL DISCS

FIELD OF THE INVENTION

This invention relates to optical information storage disks. More particularly, to prevent access to counterfeit copies of such disks.

BACKGROUND OF THE INVENTION

The software industry is at a crossroads at this time. More and more software is being delivered on compact disc (CD) for its cost effectiveness and ease of installation, ease of operation and the reduced cost of media and associated documentation. At the same time, the CD-Recordable industry is set to explode into the consumer market as prices for CD recorders are sharply decreasing. The cost of blank CD recordable media will also drop as more and more consumers purchase recorders and economy of scale manufacturing brings the cost down.

While taken individually these two trends are exciting and very beneficial for the consumer, together these two trends are troubling for the software publishing industry. CD recordable (CD-R) technology allows very cost effective duplication of CD products, referred to in the software industry as CD-ROM. Piracy is the predominant concern of all those who publish intellectually valuable content on CD-ROM, since it is now easily copyable onto a CD-R disc. The need therefore exists to make a CD-ROM uncopyable to thwart illegal piracy of its content.

The basic premise that is fundamental to the present invention is that the information recorded on CD-ROM and other CD media or optical media is laid out in a continuous spiral track. This track is usually (but not necessarily) read in a Constant Linear Velocity mode.

The mechanisms which read the data contained in these types of discs rely on the spiral track for not only for data, but also for tracking and location information as well. Mechanisms are built into the data recording standard which allow for defects in the media itself (defects from manufacturing as well as from misuse and damage/scratches) to be corrected. The mechanism to correct for defects is suited to defects which are characterized by certain physical and electrical limits. If these limits are exceeded, then the mechanism to correct errant data does not work. The result is an unreadable disc within the flaw causing a disruption. The disruption is enough to cause an error in the reader. This error is returned as unrecoverable and the read operation is disrupted. This disruption halts all attempts to copy data in the area within the defect.

This behavior works for copy protection because any attempt to image copy the optical media results in failure. The applications contained within an authorized copy of the optical disc can be made to work normally by making them aware of the flawed area on the disc. Since computer addressable readers like CD-ROM drives can jump discretely to any area of the disc, under software control, the flaw can be bypassed, allowing 100% functionality.

Therefore, by introducing defects selectively onto optical media such as CD-ROM, and making the applications contained within the media aware of the defects, a very effective copy protection process which is highly resistive to reverse engineering is created.

SUMMARY OF THE INVENTION

The present invention is a method and apparatus for making optical discs copy protected. The method requires that the software contained in the optical media be aware of defect in the optical media created by the method. By introducing special areas herein called the "MARK" on the media, and making the software contained within the media aware of the MARK, it is possible to thwart unauthorized copying of the optical media. The method is effective since the MARK is placed on the media via special manufacturing techniques hereinafter referred to as the "PROCESS." The PROCESS requires specialized equipment whose operations are difficult if not impossible, t:o reproduce using a conventional off-the-shelf desktop CD-Recorder. The software delivered in the media can be of any type, i.e. data or application. Access to the content of the media is established via executable code contained on the media which seeks and accesses the MARK. The software which is aware of the MARK is referred to herein as the "CODE".

DETAILED DESCRIPTION OF THE PREFERRED EMBODIMENTS

THE METHOD

Figure 1:
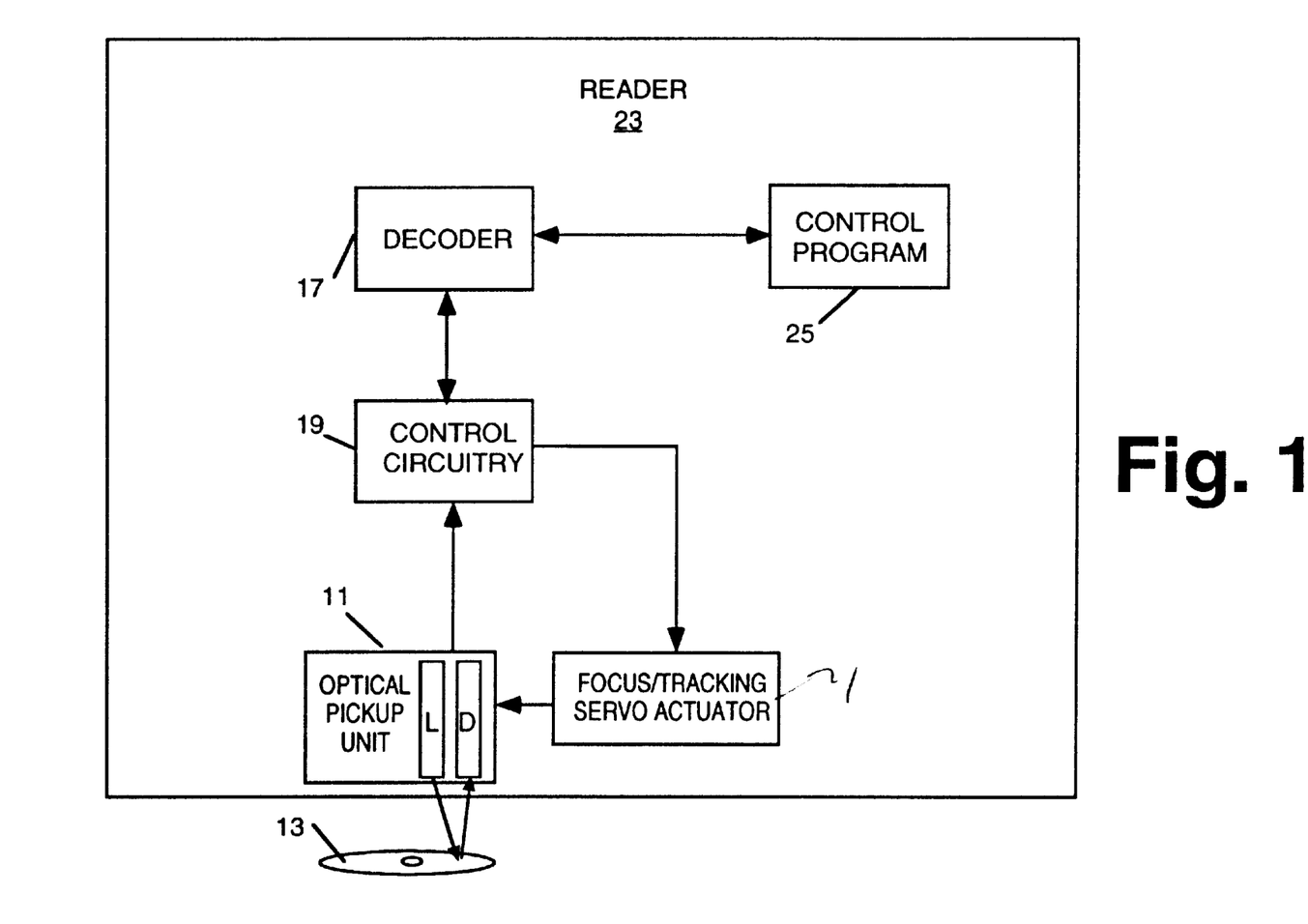
FIG. 1 is a block diagram showing the main components of a CD-ROM read mechanism.

The method exploits the way in which optical discs are read. For this explanation, a CD-ROM disc will be used, but the method applies to any optical medium with similar properties, i.e., having a focus servo loop, a tracking servo loop, and embedded error correction data which is used to compensate for missing or damaged data. The data on a CD-ROM is recorded on a spiral track. The spiral track is made up of a series of markings or pits which represent data. Referring to FIG. 1, an optical pickup unit 11 such as laser L and detector D is used to read the pits on a CD-ROM 13 and send their electronic equivalent as a signal to decoder circuitry 17 for decoding. The signal coming off the disc not only contains user data, but also control and sync information. This control and sync information is processed by control circuitry 19 which sends a signal to focus/tracking servo actuator 21 which controls the mechanical and optical parts of the reader 23 to focus the read laser and control the rotation of the disc. By fouling this control mechanism, the method is suitable for protecting against the use of unauthorized copies of the disc. If the read laser encounters an area on the spiral track which optically is correct (i.e., pits exist), but whose format is incorrect (e.g., not eight-to-fourteen modulation (EFM) as required by what is known in the industry as the Yellow Book specification for CD-ROM data), then the control circuitry 19 and decoder circuitry 17 become confused and an error condition is generated in the device, i.e., reader 23 used to read the optical media. This error condition gets propagated to a control program 25 which is in control of the reader and creates an error condition in the control program, effectively canceling whatever operation was trying to access the disc in the area with the fouled information. By controlling the characteristics of the fouled area, a MARK can be created. This MARK becomes a type of dead-man's area, where any attempt to read it will cause an error. The method can then either look for the existence of the MARK, or look for the existence of valid data immediately after the MARK. By introducing intentional and deliberate MARK(S) into the media, the reader 23 can be made to report an error at a specific and predetermined location. This error can be used alone or in conjunction with good data or non-error areas to create unique and difficult to reproduce sequences of bad-good areas on the CD-ROM or other optical media. These sequences are what make up the basis of the MARK. The MARK can be further strengthened or authenticated by placing unique data following the MARK. The premise is that any attempt to copy the disc will be disrupted at the MARK points, so a) the MARK will not be copied, and b) the areas immediately after the MARK will not be copied, since a reader attempting to copy the media could never get past the MARK in a sequential fashion.

The unique point of the method is that introduction of the MARK(S) into the spiral track does not interrupt the spiral track. The appearance to the human-eye of the MARK is no different than the appearance of a valid EFM pit pattern in adjacent areas to the MARK. By replacing valid EFM pit patterns in the MARK area, with periodic modulated laser pits, no visible discontinuity can be seen. By hiding the identity and location of the MARK areas, the additional benefit of increased security is added to the method.

The MARK is purposely created and introduced into the CD-ROM. In conjunction with a computer program, the MARK can be used to establish the validity and authenticity of the media, primarily because unauthorized copies would not contain the specific MARK contained in an authentic disc. Once validity of the MARK is established by the computer program, then access to the data contained within the CD-ROM can be granted.

Figures 2A, 2B:
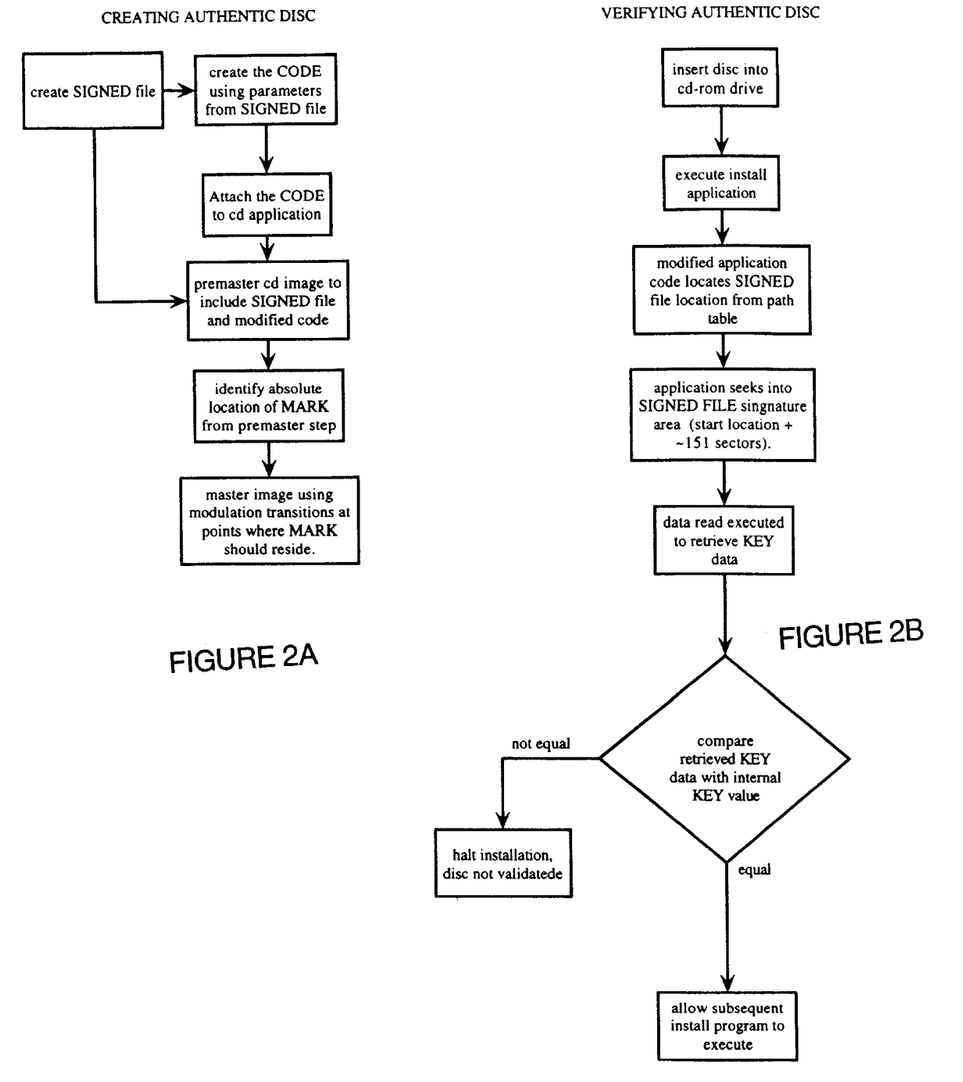
FIG. 2a is a flowchart of the steps used to create a copy protected disc according to tie METHOD.
FIG. 2b is a flowchart of the steps involved in verifying the authenticity of a copy protected disc according to the METHOD.

FIG. 2a is a flowchart of the steps involved in creating a copy protected disc according to the METHOD. FIG. 2b is a flowchart of the steps involved in verifying the authenticity of a copy protected disc according to the METHOD.

THE MARK

The MARK is a special area on the media which is placed on the media during the mastering process. This MARK is difficult to reproduce by other than a LBR (laser beam recorder) used in mass CD-ROM manufacturing. The LBR is capable of maintaining constant linear velocity and spiral tracking without the need of feedback from the disc. This allows the creation of the MARK by modifying the modulation of the laser which is creating the pits. A desktop CD-recorder requires feedback from the media in the form of a tracking signal generated by a wobble track pre-formed on the blank media. Current generation CD-recorders are not designed to create the MARK. If the feedback is interrupted in any way, then tracking is affected adversely, and any record operation will fail. The technique should prove effective against mass duplication since a significant reverse engineering effort would be required to read the source disc in its entirety, in order to produce the master needed for mass duplication. In other words, even a factory set up to do mass duplication needs a master from which to make the necessary molds for the mass produced discs. The master must be created from the copy protected disc, which will create many difficulties in attempts to read 100% of the disc.

The MARK can be used alone, or with useful data immediately following the MARK. The valid data takes the form of a pattern (i.e. a sequence of binary numbers or ASCII characters) which are referred to herein as the "KEY." The KEY is generated or created in the same step as the CODE described later. The KEY is provided as a file (the KEY file) which ultimately will contain the MARK. The combination of the MARK and the KEY is referred to herein as the "SIGNATURE."

The MARK, although more straight forward to implement than the SIGNATURE, may require the CODE to be aware of the exact type of hardware used to read the CD-ROM. This is because different hardware react differently to an encounter with a MARK. Some hardware is capable of generating an error and recovering from the laser entering the MARK, but other hardware may not be able to recover from the laser entering the MARK, and entrance into the MARK may lock-up or disable further operation of the hardware, requiring possibly a re-boot or reset of the hardware. The SIGNATURE is much safer to implement on all hardware readers, since via program control, the laser is instructed to jump just past the MARK and begin reading the added valid data. In the case of the SIGNATURE, the reading and processing of the data following the MARK can be used to authenticate the contents of the CD-ROM. Multiple MARKS and/or SIGNATURES can be used on the disc for authentication to provide an increased level of security.

The MARK(S) and/or SIGNATURE(S) need to be in the data area of the CD-ROM. For this reason, they are created inside files which are used as containers. In other words, a file which has the MARK(S) and/or SIGNATURE(S) within its physical real-estate on the disc is considered to be MARKED and/or SIGNED. In most cases the MARKED and/or SIGNED file is unique and separate from the CODE, but it does not have to be. In some instances, the MARK(S) and/or SIGNATURE(S) can be placed inside either executable and/or data files. In doing so, very elaborate copy protection mechanisms can be developed by utilizing file-lengths, checksums, file placements, etc. Such layered copy protection mechanisms can be used alone or in conjunction with more simple mechanisms which only use separate and unique MARKED and/or SIGNED files.

Figure 3A:
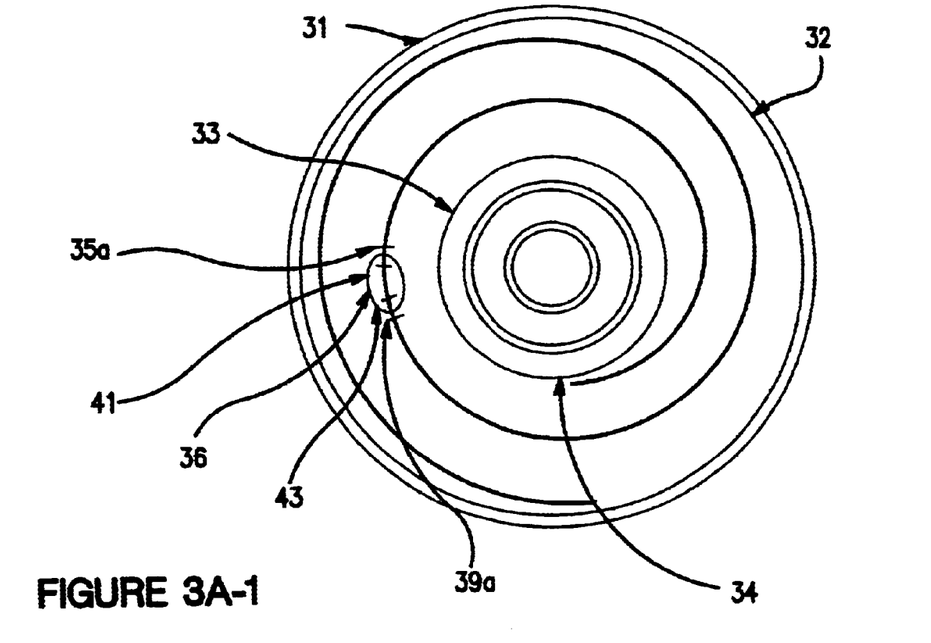
FIG. 3a is a representation of a CD-ROM disc with a MARK file.
FIG. 3b is a flowchart of the steps used to create a MARK file.
Figure 3A:
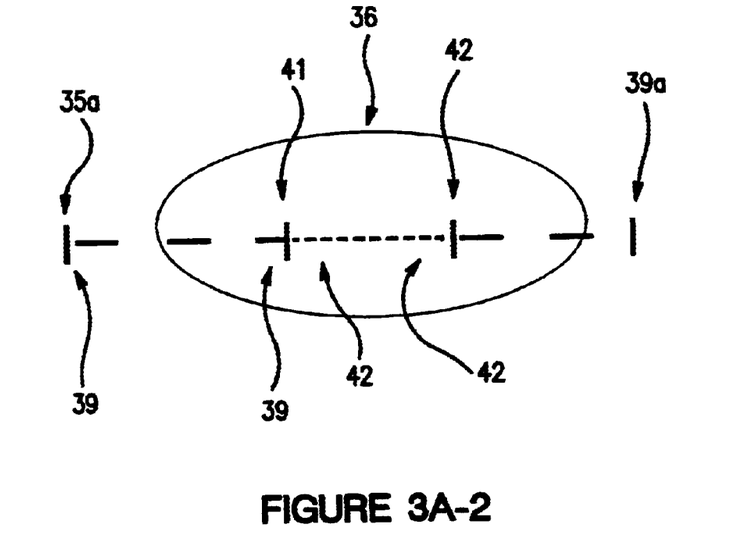

Specific details showing the existence of a MARK 42 on a CD-ROM disc will now be explained with reference to FIG. 3a. The CD-ROM disc 31 has an outer limit of reflective layer 32, an inner limit of reflective layer 33 and a data track 34. A MARK file has a start position 35a, a transition point 41 from valid EFM to modulation signal, a transition point 43 from modulation signal to valid EFM, a MARK 42 with detail of the MARK and adjacent EFM transitions shown at 36, and an end position 38a of the MARK file. There may be an optional buffer zone 39 prior to MARK 42.

Figure 3B:
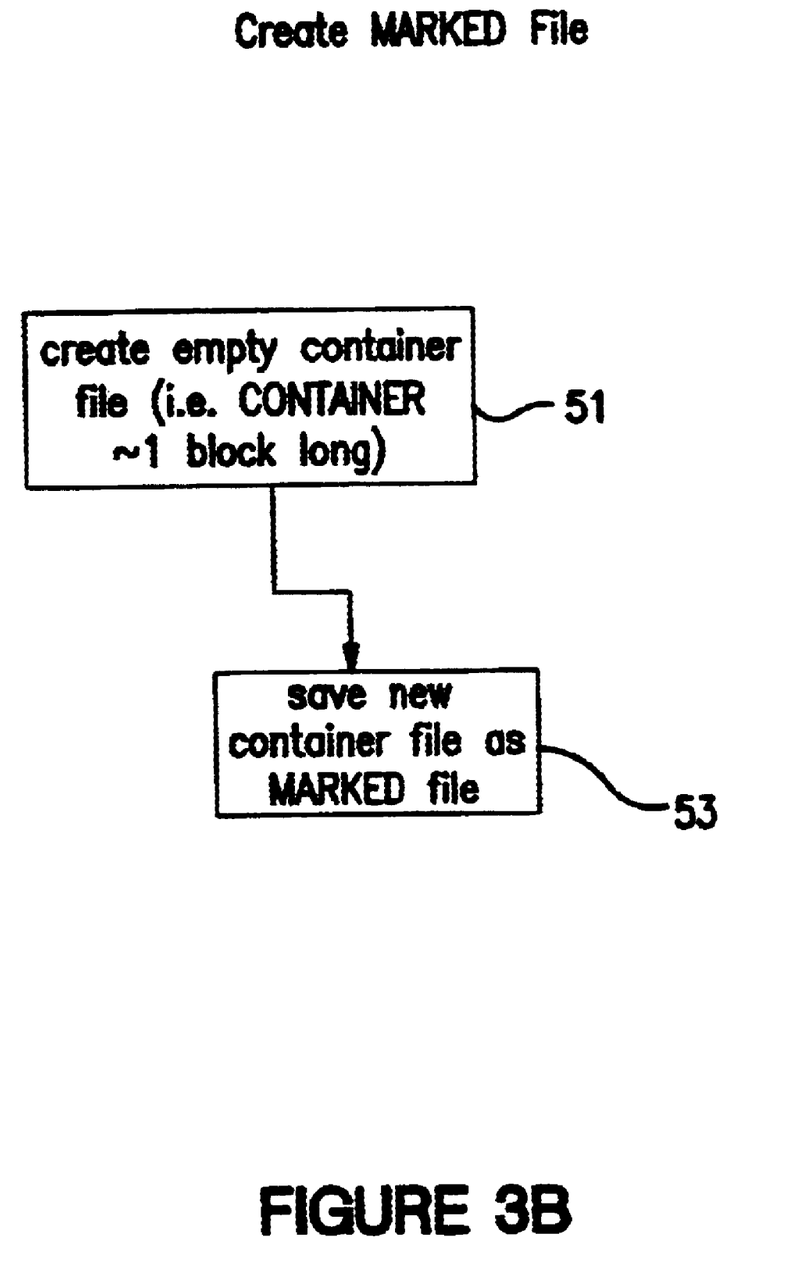

FIG. 3b shows the steps to create a MARK file. The first step 51 is to create an empty container file approximately one block long. The second step 53 is to save the container file as a MARKED file.

Figure 4A:
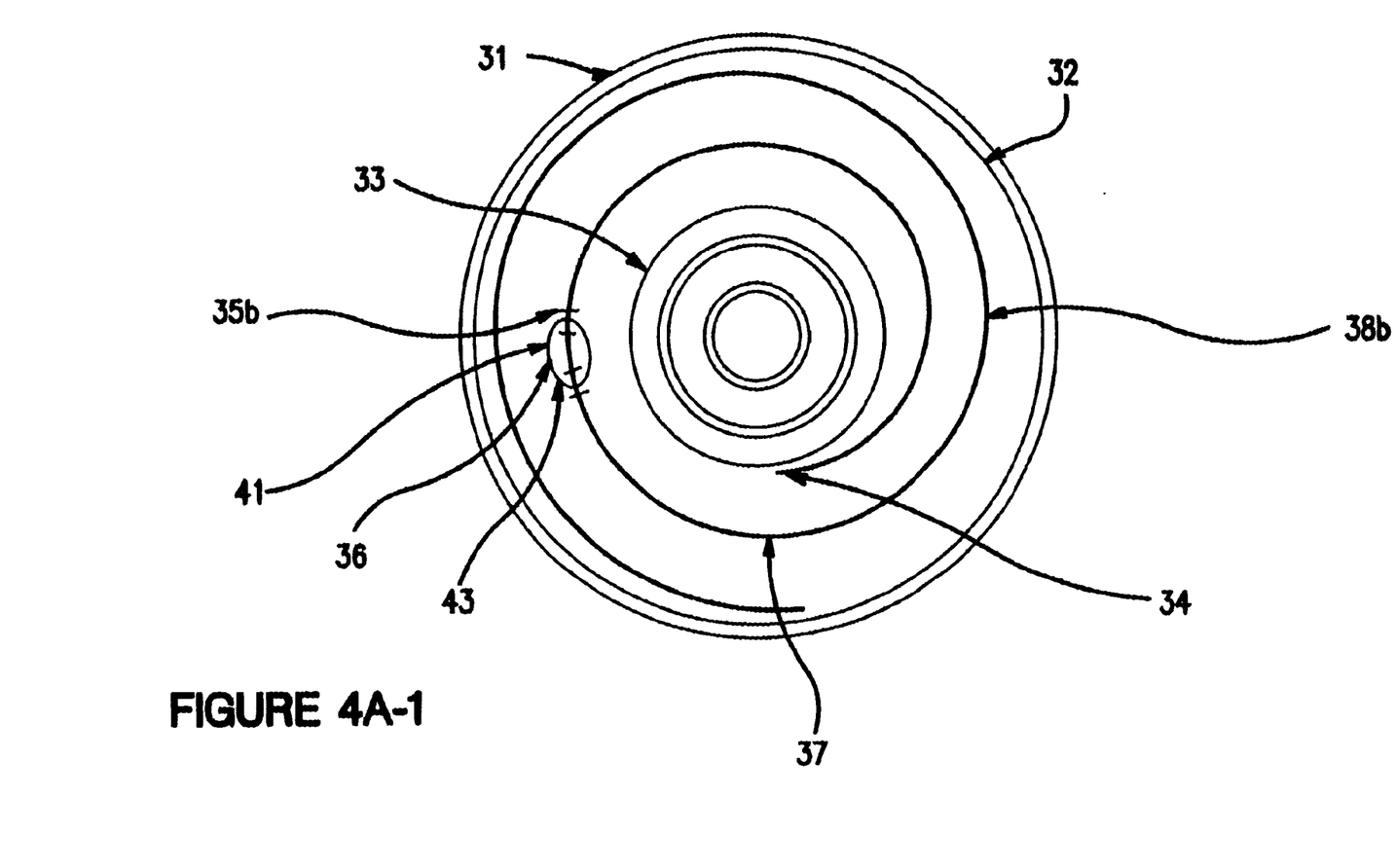
FIG. 4a is a representation of a CD-ROM disc with a SIGNATURE file.
FIG. 4b is a flowchart of the steps used to create a SIGNATURE file.
Figure 4A:
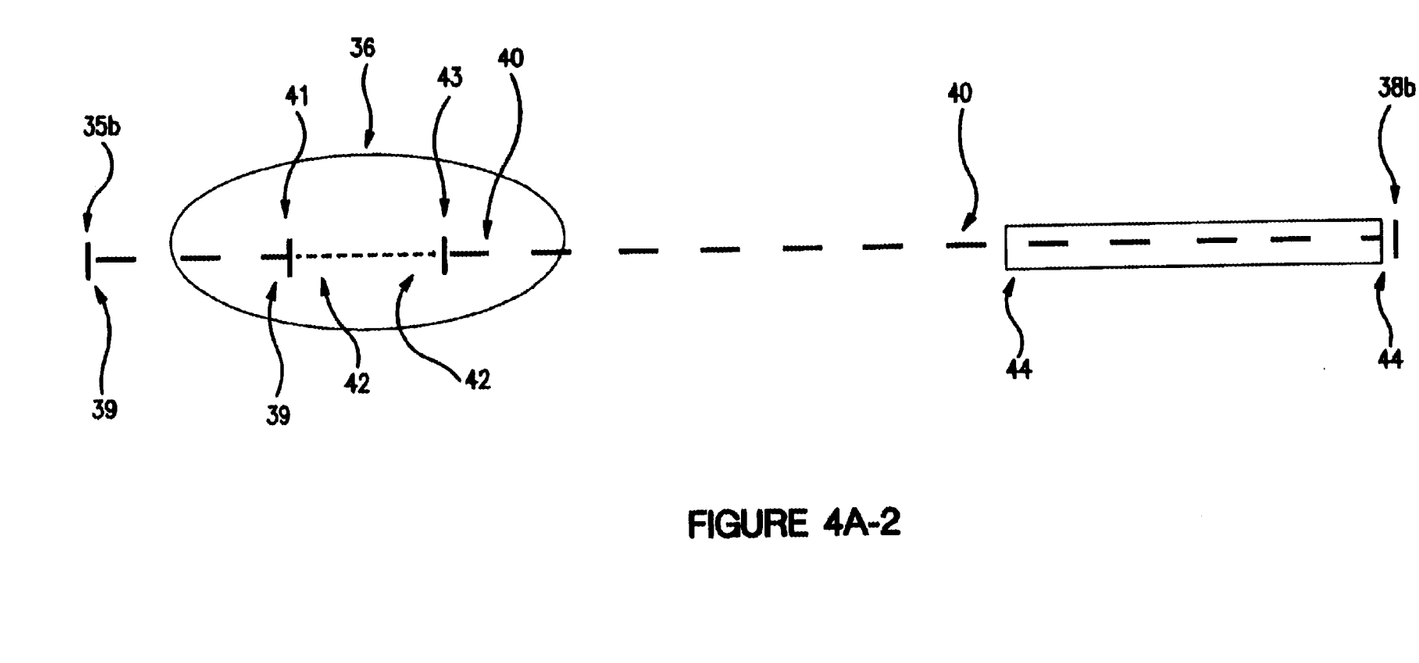

Specific details showing the existence of a SIGNATURE file 37 and MARK 42 will now be explained with reference to FIG. 4a in which like numbered elements have the same meaning as in FIG. 3a. A SIGNATURE file has a start position 35b, a transition point 41 from valid EFM to modulation signal, a transition point 43 from modulation signal to valid EFM, a MARK 42 with detail of the MARK and adjacent EFM transitions shown at 36, a buffer zone 40 after the MARK (approximately 150 sectors), authentication KEY data 44, and an end position 38b of the SIGNATURE file.

Figure 4B:
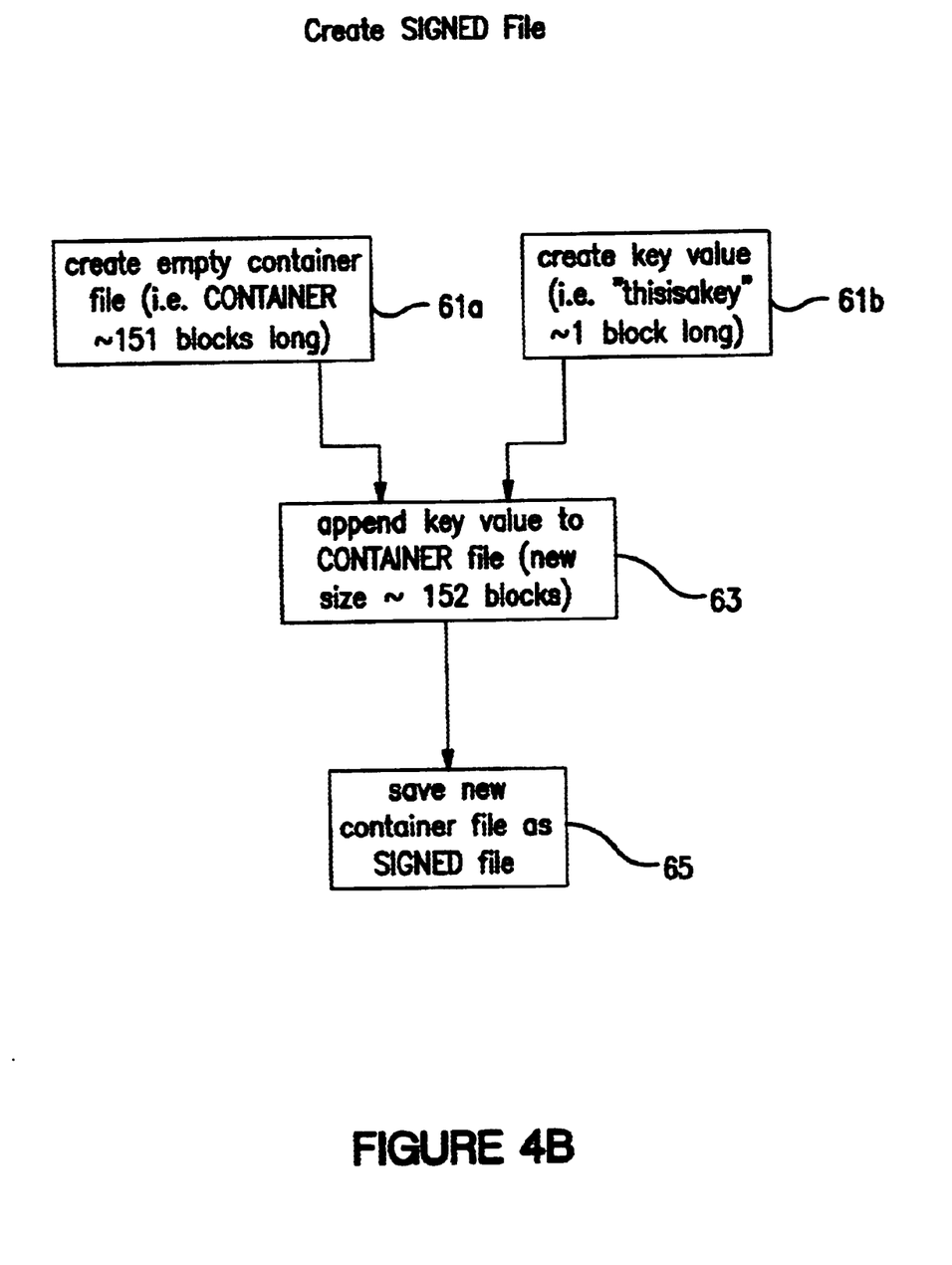

FIG. 4b shows the steps to create a SIGNED file. The first step 61a is to create an empty container file approximately 151 blocks long. Also created at step 61b a key value is created. At step 63, the key value is appended to the container file creating a new file which is one block longer. At step 65 the new container file as a SIGNED file.

THE PROCESS

The PROCESS is the actual steps involved in creating the MARK(S) and/or SIGNATURE(S). For explanation purposes, the creation of a SIGNATURE will be described. Since the SIGNATURE includes a MARK, the explanation includes the creation of the MARK. Also a separate and unique SIGNED file will be used for the explanation. A more detailed explanation of how MARK(S) and/or SIGNATURE(S) inside data and/or executable files will be discussed in the CODE explanation section below. In any case, MARK(S) and/or SIGNATURE(S) inside executable and/or data files are prepared the same way in the PROCESS.

First a CD-ROM image is created in the premastering process. The premastering process is where files are arranged and laid out according to a file-system specification such as ISO9660, HIGHSIERRA, HFS, etc. The image created includes files which contain the CODE. The CODE will be explained below, but the CODE contains instructions about the specific locations of any MARKS and/or SIGNATURES which should be on the disc. When the CD-ROM is premastered, one of two things must happen. Either a) the premastering process must specifically place files associated with the MARK(S) and/or SIGNATURE(S) at predetermined positions, or b) in the case that the CODE is very elaborate, no regard to position is necessary during premastering, since the CODE will determine the location of the MARK(S) and/or SIGNATURE(S) from path table and directory information which are created during the premastering process.

In the case of option (a) above, after the premastering process, the files which are MARKED and/or SIGNED now reside physically at a CD timecode location on the image. The image is then used to create either a CD-R master or a 1630 U-matic Tape as input to the cutting process. After the image is created, a table or list indicating the CD-timecode where the MARKED and/or SIGNED files are located is created. The locations on the table are used during the cutting process to create the MARK(S).

The MARK(S) are generated by switching the modulation of the LBRs laser. By switching from the CD encoder output to a free-running signal generator, the laser modulator can be forced to create a pattern on the spiral track which is similar in appearance to valid EFM pits, but contains no EFM. Modulating the laser with, for example, a sinusoidal oscillator at a frequency of 308.7 kHz a pit pattern which is inconspicuously similar to valid EFM is created. In actuality, any modulation value with frequencies from 720 kHz to 196 kHz will work as well. This frequency range corresponds to the frequencies which I3 signals thru I11 signals (described below) assume when placed on the media due to their respective duration periods. The clock timing signals in the decode circuitry used for playback are locked to the channel bit frequency of 4.3218 MHz (according to the compact disc audio and data specifications, the so-called Red and Yellow Books). Data on the disc is represented using a coding called EFM (eight-to-fourteen modulation). EFM is a code where each symbol of 8 data bits is mapped onto 14 channel bits. To each block of 14 channel bits, 3 extra bits are added for merging the blocks and for low frequency (LF) suppression. The information is contained in the positions of the transitions. For mapping 8 data bits, 256 combinations of channel bits are needed. The EFM code is generated in such a way that the minimum distance between 2 transitions is 3 channel bits (–1.5 data bits) and the sampling window (eye pattern) is 1 channel bit (–0.5 data bit). The maximum run length within the blocks is 11 channel bits (–5.5 data bits). It is possible to make 267 different patterns containing transitions in 14 channel bits with the requirement that Tmin=3 channel bits and Tmax=11 channel bits (the so called I3 thru I11 pit patterns). Only 256 patterns are needed, therefore 10 are skipped for concatenation reasons and 1 arbitrarily. Of these skipped patterns, 2 are reserved for control and display synchronization. The extra 3 bits do not need to contain a transition, so between the blocks, the requirements for Tmin can always be fulfilled. So for a Tmin value (I3) a respective frequency would be 4.3218 MHz/3=1.4406 MHz (this is a frequency for the half period, either positive or negative slope) so a further division by 2 yields 720.3 kHz. Similarly, for a Tmax value (I11) a respective frequency would be 4.3218 MHz/11=392.891 kHz (this is a frequency for the half period, either positive or negative slope) so a further division by 2 yields 196.45 kHz. By switching valid EFM with the sinusoidal modulation very quickly, using, for example, a logic gate, a seamless integration of the MARK (S) is made.

In the case of most LBRs, no provision is usually available to precisely trigger an event or operation at an exact CD timecode. For this reason, the development of a special CD timecode monitor is explained. This device is not necessary if there is a mechanism on the LBR which can precisely read the CD timecode of the pits being created at the laser output of the LBR. The ability to precisely read timecode is necessary in order to locate the MARK(S) at the predetermined location(s) which are derived from the table of timecodes generated in the premastering process.

In order to accomplish the switching accurately and quickly, an EFM decoder is used to give exact timecode values of the LBR laser output. Such an EFM decoder is commercially available (such as the Kenwood subcode analyzer which is capable of reading decoding and displaying the timecode located in the EFM signal). Otherwise a specially modified CD-ROM drive can act as an EFM decoder and at the same time provide a computer interface to read and process the timecode being decoded. Since a CD-ROM drive uses a laser to get an EFM pattern off a disc, by channeling an EFM signal from the LBR to the modified input section of a CD-ROM drive, it can be made to think the LBRs EFM is actually being read off a disc. The CD-ROM drive then acts as though it were reading a CD-ROM disc, and by utilizing the "GET TIMECODE" command for the drive, which is known in the art, a computer can read the timecode in the EFM signal. At this point, a program which has access to the decoded timecode values on the EFM, and the timecode values from the premastering, can be used to trigger a solid state switch connected to either the final modulator in the LBR laser path or the TTL electronic signal at the output of the EFM encoder. The solid state switch would then switch on the free running sinusoidal oscillator and drive the LBRs output. By switching between the oscillator and EFM, the MARK(S) can be created.

Figure 5:
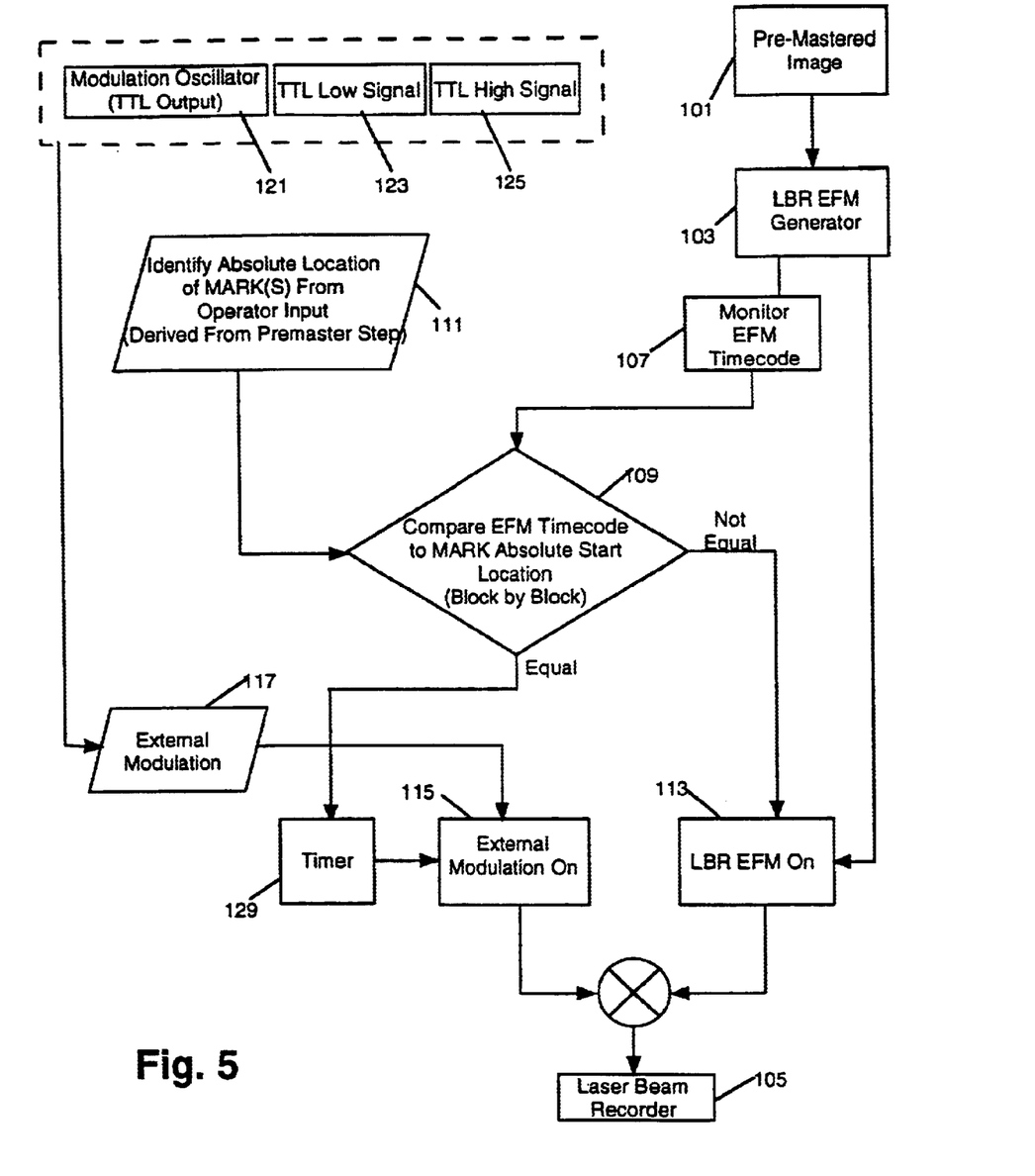
FIG. 5 is a flowchart of the PROCESS.

Referring now to FIG. 5, an implementation of the PROCESS described above is explained. A premastered CD-ROM image 101 is created according to prior art techniques. Normally, the premastered CD-ROM image is provided to an LBR EFM generator 103 which generates an appropriate signal to control laser beam recorder 105 which "cuts" a master CD-ROM (not shown). In order to implement the process, additional steps are utilized. Specifically, the EFM timecode is monitored 107 and compared 109 with identified absolute location of marks from operator input 111 generated during the premastering step. If the comparison results in a non-equality, then LRB EFM is on 113 and the laser beam recorder operates as it normally would to cut the pre-mastered CD-ROM image. However, if the timecode is equal to one of the preset absolute location of a mark, external modulation is turned on 115 (and LBR EFM is turned off). An operator selectable external modulation 117 is created by a modulation oscillator 121 or a TTL low signal 123 or TTL high signal 125 as selected by an operator. This external modulation continues to be used to control the laser beam recorder until the desired length of the mark is achieved, at which point the LBR is switched back to actual EFM. A desired length is one which exceeds the error correction capabilities of the media standard. In the case of the Red and Yellow Books, that would be a mark which is greater than 450 symbols or 335 bytes, which translates to a mark larger than 1.9 ms in time length (at 1× read) or approximately 2.3 mm in distance length. This may be accomplished using a timer 129 set to 1.9 ms wherein the timer is started when the timecode to switch from EFM to modulation arrives. When the timer expires, a switch back to EFM occurs.

THE CODE

The CODE is a piece of software which is created and is either a stand-alone application, or is attached to an existing application program. The purpose of the CODE is to verify the MARK(S) and/or SIGNATURE(S) validity. Verification is done via access to the media, reading data off the media, and then comparing that data with data in the CODE. The CODE can be very simple, or it can be very elaborate. The complexity of the CODE is determined by the amount of security desired in the copy protection method.

The CODE is chronologically the first step in the PROCESS. The creation of the CODE determines where the MARK(S) and/or SIGNATURE(S) will be placed on the media. The CODE internally maintains specific information about where on the media to locate the MARK(S), and in the case of SIGNATURE(S), how to read the data which follows the MARK(S).

There are two ways in which the CODE can locate the MARK(S) and/or SIGNATURE(S) on the media. The first way is via hardcoding of the locations. The second is by filename resolution. Hard-coding means that unique and specific values for where to find the MARK(S) and/or SIGNATURE(S) on the media are maintained by the CODE. Filename resolution is where the CODE only maintains the name of the container file which holds the MARK(S) and/or SIGNATURE(S), the so-called MARKED and/or SIGNED file(s). The CODE then determines where the MARK(S) and/or SIGNATURE(S) are located by resolving the filename in the path table or file allocation table of the media. Filename resolution requires more effort and complexity on the part of the CODE, but it gives more freedom to placement of the MARK(S) and/or SIGNATURE(S). By using filename resolution, the premastering of the CD-ROM image is less complicated, i.e. files do not need to be placed at very specific addresses.

When run, the CODE looks internally for where to find the MARK(S) and/or SIGNATURE(S) and then goes to the media, seeks to the specified location(s) and reads data. Upon retrieval of data, a comparison is made between the data read and what should be a KEY indicating authenticity. If the KEY is authenticated, then the CODE proceeds with any more MARK(S) and/or SIGNATURE(S) that may remain. When all the MARK(S) and/or SIGNATURE(S) are authenticated, the CODE grants access to the media by allowing the application(s) which are associated with the media to run. If any of the MARK(S) and/or SIGNATURE (S) fail authentication, then the CODE assumes the media has been duplicated illegally, and prohibits the applications which are associated with the media to run. The CODE is created by a programmer who has access to source code for the application which is associated with the media. By adding program instructions to the application associated with media, the CODE is created. Concurrently, the KEY file(s) (which will be passed along to the premastering step) is created. The actual language of the CODE is determined by a) the integration of the new program instructions with the existing application, and b) the performance of, and hack-proofing of the KEY checking program instructions.

The KEY file takes on the form of at least 2352 (1 CD-ROM block) bytes which are reserved for the non-EFM pit pattern modulation, followed by as many bytes as required to store the KEY. So in the case that the KEY was 2352 bytes long, a total of 4704 bytes would be required for the KEY file. If CD-ROM drives could perfectly seek to exact addresses in one jump, then this would be the smallest size for a KEY file. CD-ROM drives, however, usually seek to a particular address by successive approximations. This means that the drive seeks to an earlier position than the target address by jumping across many spiral tracks at a time, then as the target address is near, settles into the spiral and follows it until the required address is reached. This seeking methodology would never reach the KEY in the KEY file because the MARK would always interfere. For this reason, a buffer zone between the MARK and the KEY needs to be included in the KEY file. This buffer zone becomes a landing area for the laser pickup as it is instructed to reach the KEY. The Yellow Book Specification which governs the CD-ROM media indicates that "the accuracy of the start and stop points depends on the player design." Since the player design determines at what point the optical pickup stops jumping tracks and settles into to the spiral, a sufficient buffer zone to land the pickup from a track jumping seek is required. Experimental results have shown that 150 CD-ROM sectors is sufficient and accommodates most CD-ROM drives. With a value of 150 sectors as a buffer, now the minimum size for the KEY file becomes 1 sector for the MARK, 150 sectors for the buffer zone and 1 Sector for the KEY (equal to 152 sectors or 352800 bytes). The only other consideration for the KEY file size is the accuracy of the switching in the PROCESS from valid EFM to sinusoidal modulation. If the switching time is long, or if propagation delays skew or affect the switching position, then additional buffering may be required to compensate for PROCESS deficiencies. Additional buffering may be required in the case of PROCESS deficiencies before the location of the MARK and after the MARK.

Figure 6:
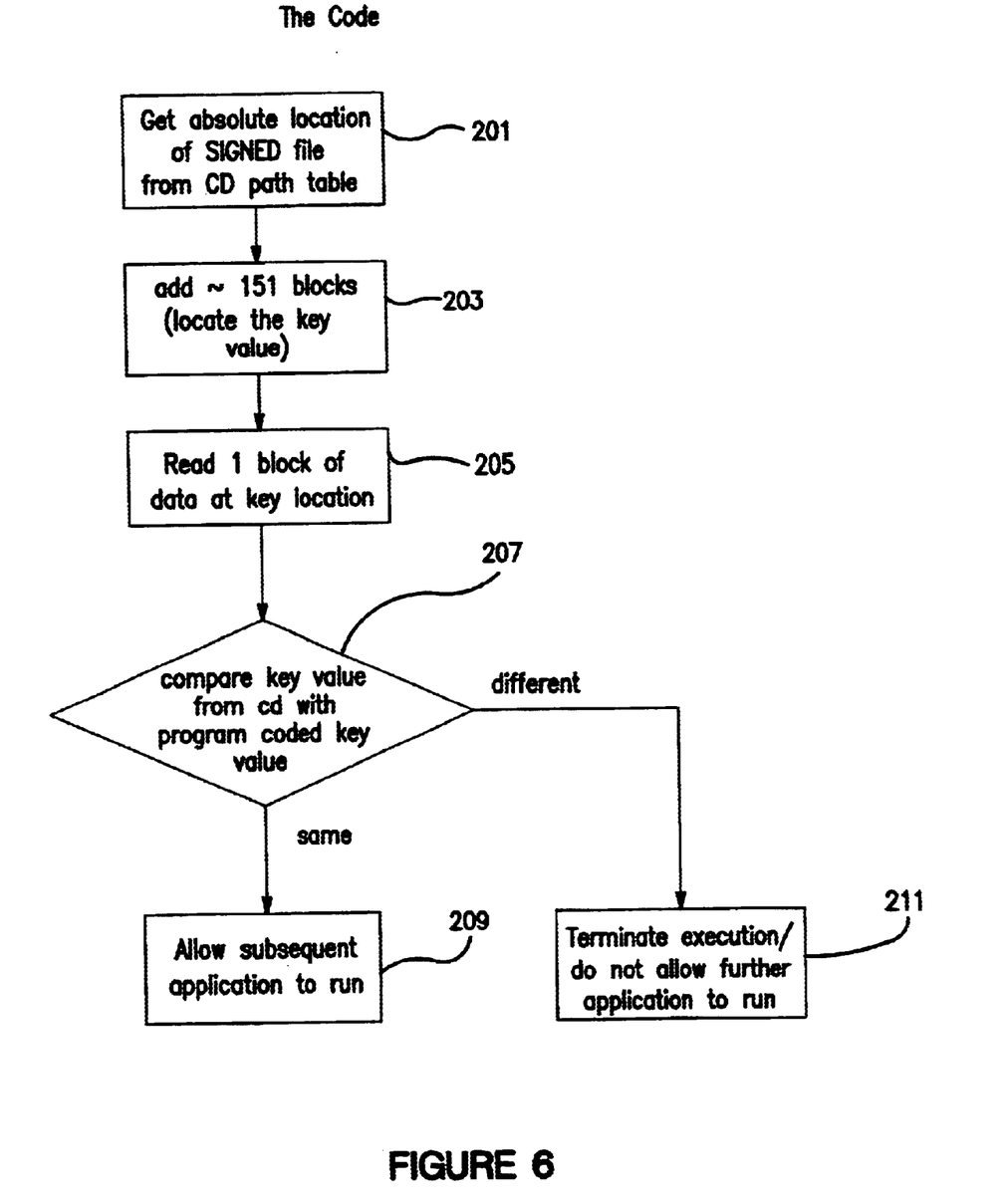
FIG. 6 is a flowchart of the CODE.

FIG. 6 is a flowchart of the steps used by the CODE. The first step 201 is to obtain the absolute location of the SIGNED file from the compact disc path table. In the next step 203, approximately 151 blocks are added to allow for the location of the key value. At the next step 205, a block of data at the key location is read. The at comparison step 207, the key value which was read is compared with a program coded key value. If it is the same, step 209 allows the application to run, otherwise, step 211 terminates further execution.

I claim:

1. A method for protecting against unauthorized copying of information on an optical medium comprising the steps of:
   a) placing at least one mark at each of at least one corresponding predetermined location on an optical medium, which at least one location is within a continuous spiral track of said optical medium, which mark is incapable of being reproduced except by a mass reproduction recorder, and which mark, when read by a device adapted to read data contained in said continuous spiral track is incapable of being read, and, thereby prevents writing a copy of said mark on an optically recordable medium;
   b) adding an executable code module to said optical medium, said executable code module adapted to verify said at least one mark, and allow access to data and programs on said optical medium after said verification of said at least one mark.

2. The method defined by claim 1 wherein said executable code module verifies said at least one mark by determining whether a location of said at least one mark on said optical medium is at said corresponding predetermined location.

3. The method defined by claim 1 wherein said executable code module verifies said at least one mark by determining whether a location of said at least one mark on said optical medium is at said corresponding predetermined location, and comparing a key value associated with said mark with a correct key value.

4. The method defined by claim 1 further comprising the steps of:
   a) determining whether an optical medium being read has said at least one mark at said at least one corresponding predetermined location;
   b) allowing access to information on said optical medium being read only if each of said at least one marks is determined to be at each of said at least one corresponding predetermined locations.

5. The method defined by claim 1 wherein said predetermined location is a predetermined physical location.

6. The method defined by claim 1 wherein said predetermined location is contained in a path table on said optical recordable medium.

7. The method defined by claim 1 wherein said at least one mark is created by switching modulation of a laser beam recorder used in a mass optical disc manufacturing setting.

8. The method defined by claim 1 wherein said executable code module verifies said at least one mark by maintaining a value identifying a particular location on said optical medium at which said at least one mark should be and comparing said value with a location value obtained from reading an optical medium being verified.

9. The method defined by claim 1 wherein said executable code module verifies said at least one mark by maintaining a name of a container file which holds said mark on said optical medium and then resolving the container file name in a path or file allocation table on an optical medium being verified.

10. The method defined by claim 3 wherein a buffer zone exists on said optical medium between said mark and said key value.

11. The method defined by claim 3 wherein said mark is stored in one sector of said optical medium and said key value is stored in a second sector of optical medium.

12. The method defined by claim 10 wherein said mark is stored in one sector of said optical medium and said key value is stored in a second sector of said optical medium, and said buffer zone is at least 150 sectors disposed between said one sector and said second sector.

13. The method defined by claim 7 wherein said modulation is obtained by an oscillator operating at a frequency between 720 kHz and 196 kHz.

14. The method defined by claim 7 wherein said modulation is obtained by an oscillator operating at one of 0 Hz and a constant DC level greater than 0 Hz.

15. A method for protecting against unauthorized copying of information on an optical medium comprising the steps of:
   a) placing at least one mark at each of at least one corresponding predetermined location on an optical medium, which at least one location is within a continuous spiral track of said optical medium, which mark is incapable of being reproduced except by a mass reproduction recorder, and which mark, when read by a device adapted to read data contained in said continuous spiral track is incapable of being read, and, thereby prevents reading and of data following said mark and subsequent writing of said unread data on an optically recordable medium;
   b) adding an executable code module to said optical medium, said executable code module adapted to verify correctness of data following said mark contained on said optical medium.

16. The method defined by claim 15 wherein a buffer zone of a predetermined size is disposed between said data to be verified and said mark.

17. The method defined by claim 16 wherein said mark is stored in one sector of said optical medium and said data to be verified is stored in a second sector of said optical medium, and said buffer zone is at least 150 sectors disposed between said one sector and said second sector.

* * * * *